United States Patent [19]
Jacobsen

[11] Patent Number: 5,476,986
[45] Date of Patent: Dec. 19, 1995

[54] METHOD FOR CLEANING A MIXTURE OF AIR AND VAPOR FROM VOLATILE CRUDE OIL WITH RECOVERY OF THE HYDROCARBONS, AND A SYSTEM FOR USE IN THE METHOD

[76] Inventor: Anker J. Jacobsen, Bjergbakkevej 45, DK-2600 Glostrup, Denmark

[21] Appl. No.: 256,373

[22] PCT Filed: Jan. 29, 1993

[86] PCT No.: PCT/DK93/00035

§ 371 Date: Jul. 22, 1994

§ 102(e) Date: Jul. 22, 1994

[87] PCT Pub. No.: WO93/15166

PCT Pub. Date: Aug. 5, 1993

[30] Foreign Application Priority Data

Jan. 30, 1992 [DK] Denmark ................................. 0114/92

[51] Int. Cl.$^6$ ................................. C07C 7/10; C07C 7/00
[52] U.S. Cl. ..................... 585/836; 585/867; 95/149; 95/187; 95/229; 95/237; 422/243; 422/291
[58] Field of Search ................. 585/836, 867; 95/149, 187, 229, 237; 422/243, 291

[56] References Cited

U.S. PATENT DOCUMENTS 4,475,928 10/1984 Jacobsen .................................. 95/17

OTHER PUBLICATIONS

International Search Report dated May 4, 1993 for Application No. PCT/DK93/00035.

*Primary Examiner*—Sharon Gibson
*Assistant Examiner*—Nhat D. Phan
*Attorney, Agent, or Firm*—Finnegan, Henderson, Farabow, Garrett & Dunner

[57] ABSTRACT

A method for cleaning a mixture of air and vapour from volatile crude oil with recovery of the hydrocarbons, wherein the vapours are absorbed in an absorption means (3) by direct contact with a petroleum distillate, such as "petroleum" which has been cooled sufficiently beforehand to cause combined cooling condensation and absorption of the hydrocarbons, the petroleum distillate having a substantially constant hydrocarbon concentration is transferred from the absorption means (3) to a buffer tank (5), from which it is conveyed either to a stripping means (4) in which the hydrocarbons dissolved in the petroleum distillate are stripped so that the petroleum distillate circulates in a substantially closed circuit, or for further processing or use. Prior to absorption under pressure in the absorption means (3) the entering mixture of air and vapour is compressed in a compressor (1) and washed with crude oil under pressure in a washing column (2). The hydrocarbons recovered in the stripping means (4) are recirculated to the compressor (1). This makes it possible to recover vapours from very volatile crude oil having a high gas content in a system, which occupies less space than traditional systems and can therefore be installed e.g. on board tankers.

3 Claims, 1 Drawing Sheet

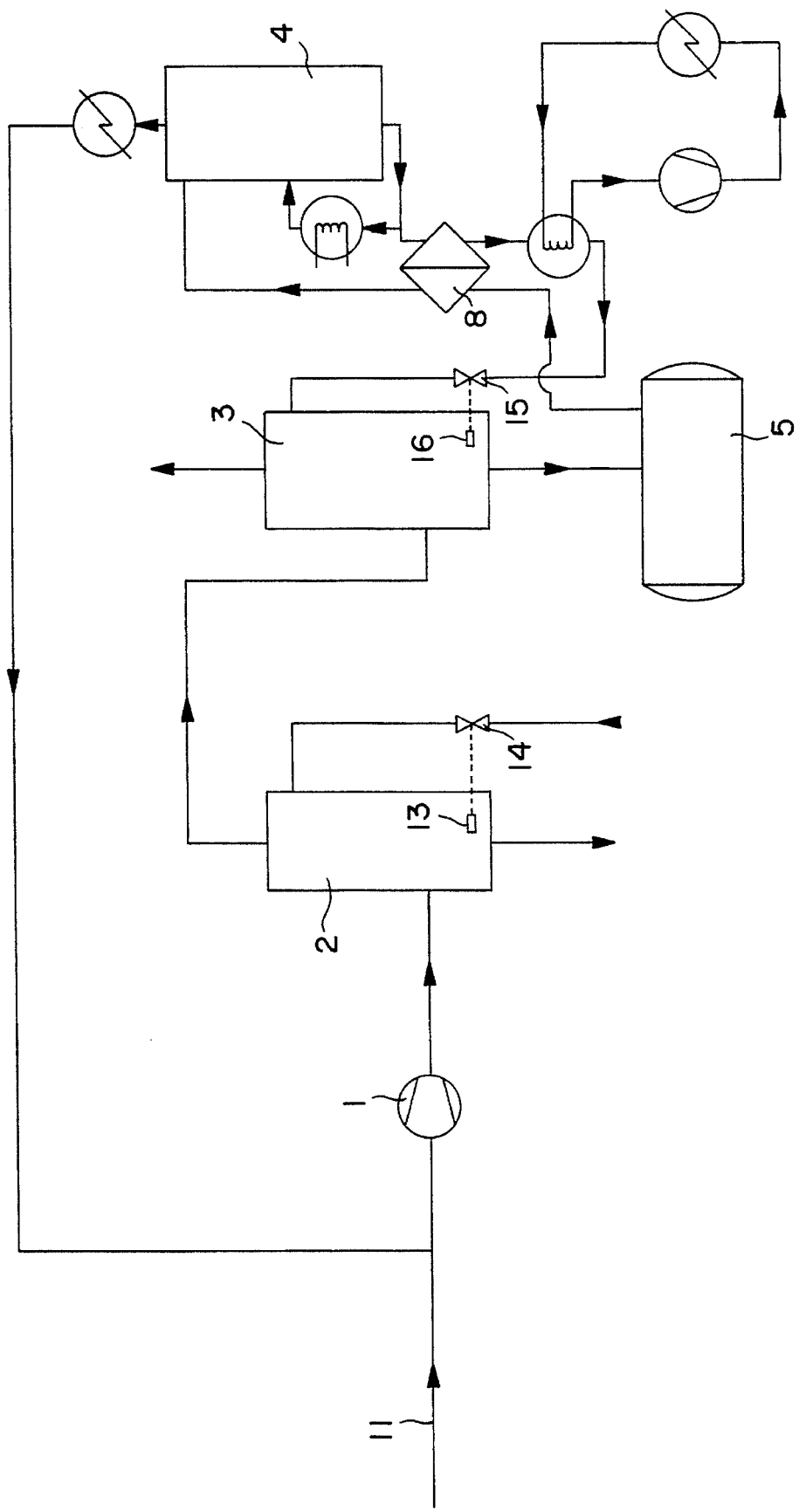

METHOD FOR CLEANING A MIXTURE OF AIR AND VAPOR FROM VOLATILE CRUDE OIL WITH RECOVERY OF THE HYDROCARBONS, AND A SYSTEM FOR USE IN THE METHOD

BACKGROUND OF THE INVENTION

The present invention concerns a method for cleaning a mixture of air and vapour from volatile crude oil with recovery of the hydrocarbons.

The invention also concerns a system for use in the method.

Volatile crude oil has a high vapour pressure at normal temperatures both in summer and winter. The high vapour concentration above the crude oil entails that a considerable loss occurs owing to the evaporation in the handling of the oil, e.g. in the filling of storage tanks. It is clear that it is of extremely great importance to reduce theses losses, both for economic reasons and for working environment and safety reasons.

Therefore, a plurality of methods aiming at reducing such losses have been developed in the course of time. Thus, the Danish Patent Application 0257/83 discloses a method and a system for recovering petrol from a mixture of petrol vapour and air by absorption of the petrol in a cooled petroleum distillate having a higher boiling point range than the boiling point range of the petrol. The petroleum distillate is successively cooled by heat exchange with a cold reservoir, brought into direct contact with the mixture of petrol and vapour to absorb the petrol, transferred to a buffer tank and transferred further to a stripping means which may be a distillation column. When thus cooling condensation and absorption of the petrol vapour are combined and the amount of cooled petroleum distillate brought into contact with the mixture of petrol and air is controlled so that the petrol concentration in the petroleum distillate transferred to the buffer tank is substantially constant, excellent optimum control of the petrolum absorption process is obtained, both in average load operation as well as in peak load operation. Reference is made to the above-mentioned Danish patent application for more detailed process and apparatus features.

In spite of its advantages, such a recovery system has certain drawbacks, one of the greatest being that the system takes up rather much space. In connection with oil exploitation from drilling platforms on the open sea it would thus be an advantage if the volatile hydrocarbon vapours could be recovered already when the volatile crude oil is pumped into tankers, but the large dimensions of the system known from the Danish Patent Application 0257/83 makes it less suitable for installation on a tanker. Furthermore, it is difficult to obtain a sufficiently high efficiency with the known system when the content of methane and ethane is high.

SUMMARY OF THE INVENTION

It has now been found that in connection with hydrocarbon vapours which occur in large approximately constant amounts, in high concentrations and over extended periods of time it may an advantage partly to precompress the vapours in the performance of the method known from the Danish Patent Application 0257/83, and partly to let the system operate under pressure.

This results in a reduction in volume in relation to the known method, because the vapours under pressure occupy less space. It is moreover possible to recover vapours from liquids, e.g. very volatile crude oil, with high gas contents, because the increased pressure makes it possible to handle such increased gas contents.

Accordingly, the invention concerns a method for cleaning a mixture of air and vapour from volatile crude oil with recovery of the hydrocarbons, wherein the vapours are absorbed in an absorption means by direct contact with a petroleum distillate, which has been sufficiently cooled beforehand to cause combined cooling condensation and absorption of the hydrocarbons, said petroleum distillate with a substantially constant hydrocarbon concentration being transferred from the absorption means to a buffer tank and from there being either conveyed to a stripping means in which the hydrocarbons dissolved in the petroleum distillate are stripped so that the petroleum distillate circulates in substantially closed circuit, or being passed on for further processing or use. The method of the invention is characterized in that prior to absorption in the absorption means the entering mixture of air and vapour is compressed in a compressor and washed with crude oil under pressure in a washing column, that the absorption means likewise operates under pressure, and that the hydrocarbons recovered in the stripping means are recirculated to the compressor.

As mentioned in the Danish Patent Application 0257/83 the petroleum distillate used as an absorption means must satisfy the following requirements:

It must be essentially free of smells or have only a slight smell.

It must have a low vapour pressure under the conditions of use.

It must have a freezing point or a freezing point range which is below the temperature of use.

It must have a suitably low viscosity under the conditions of use.

Depending upon the stripping method used, it should have a boiling point range whose lower limit is suitably different from the boiling point range of the disssolved hydrocarbon components.

These criteria are met by the petroleum fraction marketed in Denmark under the name of "petroleum", having a boiling point of about 180°–250° C., which is the preferred absorbing medium.

The invention moreover concerns a system for performing the present method.

BRIEF DESCRIPTION OF THE DRAWINGS

The drawing shows a system of the type known from the Danish Patent Application 0257/83 for recovering hydrocarbon vapours, said system being provided with a compressor in front and a washing column adapted to operate under pressure, in accordance with the present invention.

DESCRIPTION OF THE INVENTION

The vapours from the volatile crude oil are passed to the system via a conduit 11 after having first passed various non-return valves, etc. The vapours are compressed in the compressor 1, from which the compressed vapours are conveyed to a washing column 2. The vapours are washed here with crude oil under pressure, the crude oil being fed via a controllable valve 14 connected with a pressure sensor 13. The compressed and washed vapours are then treated by the method according to the Danish Patent Application 0257/83, said vapours being conveyed to an absorption means 3 which also receives a cooled petroleum distillate, preferably "petroleum" at about −25° C., via a controllable valve 15 connected with a temperature sensor 16. In the absorption means 3 the crude oil vapours are absorbed in the petroleum distillate, which is passed to the buffer tank 5 while the cold discharge air stripped of the hydrocarbons is passed for after-cleaning through an outlet at the top of the absorption means 3. The hydrocarbon-containing petroleum distillate is conducted from the buffer tank 5 to a stripping means, in the shown system a distillation column 4 in which the petroleum distillate is stripped of the hydrocarbons by heating and is then passed to a storage tank (not shown), in which the petroleum distillate is cooled before being recycled to the absorption means 3. The power consumption of the system is reduced by means of the shown heat exchanger 8, since the cold petroleum distillate from the buffer tank 5 is preheated before being transferred to the distillation column 4. The recovered vapours are conveyed from the top of the distillation column 4 back to the inlet of the system.

I claim:

1. In a method for cleaning a mixture of air and vapour from volatile crude oil with recovery of hydrocarbons, wherein the vapours are absorbed in an absorption means by direct contact with a petroleum distillate, which distillate has been cooled sufficiently beforehand to cause combined cooling condensation and absorption of the hydrocarbons, said petroleum distillate with a substantially constant hydrocarbon concentration being transferred from the absorption means to a buffer tank and from there either being conveyed to a stripping means in which the hydrocarbons dissolved in the petroleum distillate are stripped so that the petroleum distillate circulates in a substantially closed circuit, or being passed on for further processing or use, the improvement comprising prior to absorption in the absorption means, the entering mixture of air and vapour is compressed in a compressor and washed with crude oil under pressure in a washing column, the absorption means likewise operating under pressure, and the hydrocarbons recovered in the stripping means being recirculated to the compressor.

2. The method of claim 1, wherein the vapours are absorbed in the absorption means by direct contact with a petroleum distillate having a boiling point of 180 to 250° C.

3. A system for cleaning a mixture of air and vapour from volatile crude oil with recovery of the hydrocarbons comprising an absorption means for absorption of hydrocarbons from a received mixture of air and vapour from volatile crude oil by means of a cooled petroleum distillate, said absorption means being connected to a stripping means for stripping hydrocarbons dissolved in the petroleum distillate and a buffer tank arranged between the absorption means and the stripping means, respectively, characterized in that a washing column adapted to operate under pressure is provided in front of the inlet to the absorption means, and that a compressor is provided in front of the washing column for initial compression of the entering mixture of air and vapour.

* * * * *